United States Patent Office 2,702,245
Patented Feb. 15, 1955

2,702,245

CONVERSION OF FEATHERS

Edward J. Mayer, Salisbury, Md., assignor of twenty-five per cent to Russel Burger and twenty-five per cent to Adolf Klein, both of Philadelphia, Pa., and twenty-five per cent to Robert Mayer, Salisbury, Md.

No Drawing. Application January 27, 1949,
Serial No. 73,229

4 Claims. (Cl. 99—2)

This invention relates to a new product derived from feathers, and the method of producing the same. More particularly, it concerns the conversion of feathers to an edible and otherwise usable substance high in protein and carbohydrates, low in fiber and cellulose, and easily digested or assimilated by animals and plants.

The object of this invention is to provide a feed ingredient utilizing, as the raw or starting material, feathers from domestic fowl, such as turkeys, ducks, geese, and particularly chickens. Throughout the areas in which chickens are raised and dressed in industrial volume, most of the feathers have been a waste by-product costly of disposition. Although waste animal products have been thermally converted to useful ends, and although attempts have been made to convert feathers chemically or bacteriologically, the present invention is premised on the novel concepts that: feathers contain potentially valuable ingredients but embodied in initially unusable form and combined with deleterious elements; that the potentially valuable ingredients, such as protein and carbohydrates, can be beneficially converted or pre-digested while the original deleterious form and composition may be eliminated by thermal treatment under steam pressure; and that the final product, original impressions notwithstanding, is a usable and even edible substance.

More particularly, it is intended now to convert feathers by confinement under steam pressure first into a soupy mass and then, by drying under relatively high, but non-burning heat, to a powdery, somewhat flaky, light product.

In the attainment of these objects, a bulk of feathers as they come from the pickers is dumped into a rendering vessel of the type conventionally used for rendering waste meat products. These vessels are heated by steam in a surrounding jacket, and include a sealable lid, an agitator, and a pressure control and relief valve. Since the structure of the rendering vessel forms no part of this invention and is well known in the allied rendering art and exemplified in prior patents to Schmelzer, 1,561,667, or Richardson, 208,540, the structure will not be further detailed.

The feathers, as they come from the pickers, contain a considerable quantity of moisture and, in some instances, may have moisture added. When the lid of the vessel is closed and steam is applied to the jacket to heat the vessel to about 250 degrees Fahrenheit, steam pressure is developed within the vessel from the moisture on and in the feathers. While the steam pressure is not critical, the preferred amount is about thirty pounds. If excessive pressures develop, suitable relief may be obtained through the valve mentioned above.

The feathers are maintained at about 250 degrees Fahrenheit and 30 pounds' steam pressure, generated from their own moisture content, for about one and one-half hours while being agitated merely to prevent sticking to the sides of the vessel and to insure an homogeneous mixture. At the end of this first phase, a soupy mass, presenting no appreciable evidence of the original form of the feathers or quills results. Thereafter, the pressure control valve is opened to allow free escape of steam or vapor while substantially the same amount of heat is applied to the vessel for about six and one-half hours until the excess moisture is driven off from the mass, agitation being continued.

When the moisture content has been reduced to the range of 6 to 14 per cent, preferably 10 to 12 per cent, the product is removed from the vessel and, if desired, ground and/or sifted.

The product, which yields from 40 to 45 per cent of the original feathers by weight, is powdery and slightly flaky, dark grey-black in color, and ranging up to 80 to 90 per cent in protein content, this figure being based on tests showing approximately 17 per cent ammonia or 13.96 per cent nitrogen, both of which convert to 87.25 per cent protein. The odor, while somewhat volatile and lingering, does not appear to detract from delectability to chickens when the product is added to regular feed mixes. According to preliminary tests, the product is digestable in chickens and its values in protein and carbohydrates are apparently available for widespread utility not only as a feed, but also for fertilizer and other industrial uses.

I claim:
1. The method of producing a food ingredient for animals and plants relatively high in proteins and carbohydrates and low in fiber content comprising confining moist feathers, in the presence of moisture only in a substantially closed vessel, applying about 250 degrees Fahrenheit of heat to said vessel while maintaining the pressure of steam developed within the vessel from the moisture at about 30 pounds gauge pressure and agitating for about one and one-half hours, then releasing the pressure and continuing the application of heat and agitation until substantially all but about 6 to 14 per cent of the moisture is driven off.

2. The method of producing a food ingredient, for animals and plants, relatively high in proteins and carbohydrates and low in fiber content comprising confining moist feathers, in the presence of moisture only, in a substantially closed vessel, heating said moist feathers within said vessel, at a temperature of about 250° F. and under autogenetic, super-atmospheric pressure, for sufficient time to convert the feathers to a wet mass characterized by the substantial absence of the original physical structure of the feathers, then releasing the pressure and heating said mass to drive off moisture therefrom until the moisture content thereof is reduced to the range of about 6 to about 14 per cent.

3. The method of converting feathers to a material readily assimilable by animals and plants, comprising confining moist feathers in a substantially closed vessel, in the presence of moisture only, heating said moist feathers within said vessel, at a temperature of about 250° F. and under autogenetic, superatmospheric pressure, for sufficient time to convert the feathers to a mass characterized by the substantial absence of the original physical structure of the feathers, then releasing the pressure and heating said mass to drive off moisture therefrom.

4. The substantially dry, proteinaceous, powdery animal and plant food ingredient, containing less than about 14 percent of moisture and more than about 80% protein, produced by the steps of thermally decomposing feathers at a temperature of about 250° F. and under autogenous super-atmospheric pressure in the presence of moisture only for sufficient time to convert the feathers into a wet mass characterized by the substantial absence of the original physical structure of the feathers, followed by drying the mass under a pressure below said super-atmospheric pressure to remove excess moisture and recovering the product in powdery condition.

References Cited in the file of this patent

UNITED STATES PATENTS

| | | |
|---|---|---|
| 1,561,667 | Schmelzer | Nov. 17, 1925 |
| 2,158,499 | Grassmann | May 16, 1939 |
| 2,170,562 | Jurale | Aug. 22, 1939 |